United States Patent
Exner

[19]

[11] Patent Number: 6,015,181
[45] Date of Patent: Jan. 18, 2000

[54] FLUSH FIT REMOVABLE BACKLIGHT

[76] Inventor: Anna L. Exner, 2564 Wealdstone, Toledo, Ohio 43617

[21] Appl. No.: 08/969,051

[22] Filed: Nov. 12, 1997

[51] Int. Cl.[7] .................................................... B60J 7/12
[52] U.S. Cl. ............... 296/145; 296/146.14; 296/107.07; 160/90
[58] Field of Search .............................. 296/107.07, 145, 296/146.4; 160/90

[56] References Cited

U.S. PATENT DOCUMENTS

| | | | |
|---|---|---|---|
| 1,364,460 | 1/1921 | Soss | 296/145 |
| 1,374,249 | 4/1921 | Thomas . | |
| 1,446,986 | 2/1923 | Nelson | 296/145 |
| 1,536,037 | 4/1925 | Bishop | 296/145 |
| 1,553,099 | 9/1925 | Nelson . | |
| 1,723,466 | 8/1929 | Campbell . | |
| 2,002,596 | 5/1935 | Westrope . | |
| 2,391,871 | 1/1946 | Benson . | |
| 2,981,564 | 4/1961 | Lieberman et al. | 296/145 |
| 3,091,494 | 5/1963 | Cohen . | |
| 3,174,794 | 3/1965 | Moynihan, Jr. . | |
| 3,191,989 | 6/1965 | McCornack | 296/145 |
| 3,333,362 | 8/1967 | Kostin et al. | 49/248 |
| 3,385,629 | 5/1968 | Podolan . | |
| 3,388,945 | 6/1968 | Kevelin et al. | 296/145 |
| 3,501,196 | 3/1970 | Megargle et al. | 296/145 |
| 3,668,808 | 6/1972 | Perina | 49/465 |
| 3,745,709 | 7/1973 | Perina | 49/465 |
| 3,880,459 | 4/1975 | Kelley . | |
| 4,271,566 | 6/1981 | Perina | 24/204 |
| 4,572,570 | 2/1986 | Trucco . | |
| 4,611,849 | 9/1986 | Trenkler | 296/201 |
| 4,693,509 | 9/1987 | Moy et al. | 296/201 |
| 4,741,571 | 5/1988 | Godette . | |
| 5,040,844 | 8/1991 | Stolz et al. . | |
| 5,061,332 | 10/1991 | Stolz et al. | 156/94 |
| 5,062,248 | 11/1991 | Kunert | 52/208 |
| 5,139,846 | 8/1992 | Herwegh et al. | 428/119 |
| 5,267,770 | 12/1993 | Orth et al. . | |
| 5,271,655 | 12/1993 | Ball et al. | 296/146.14 |
| 5,320,400 | 6/1994 | Orth et al. | 296/146.14 |
| 5,325,807 | 7/1994 | Hidekura | 114/361 |
| 5,368,085 | 11/1994 | Ruparelia | 160/327 |
| 5,375,901 | 12/1994 | Agosta et al. | 296/146.14 |
| 5,396,746 | 3/1995 | Whitmer | 52/208 |
| 5,460,424 | 10/1995 | Wagner | 296/146.14 |
| 5,464,265 | 11/1995 | Hemmis et al. | 296/146.14 |
| 5,540,476 | 7/1996 | Cowsert . | |
| 5,558,390 | 9/1996 | Hemmis et al. | 296/146.14 |
| 5,560,671 | 10/1996 | Ojanen et al. | 296/146.14 |
| 5,600,922 | 2/1997 | Stolz | 52/74 |

FOREIGN PATENT DOCUMENTS

| | | |
|---|---|---|
| 284-931 | 3/1988 | Germany . |
| 294-598 | 5/1988 | Germany . |
| 3835-292 | 4/1990 | Germany . |
| 561-323-A1 | 3/1992 | Germany . |
| 4240281 | 4/1994 | Germany ..................... 296/146.14 |
| 503371 | 4/1939 | United Kingdom ................... 296/145 |

*Primary Examiner*—Dennis H. Pedder
*Attorney, Agent, or Firm*—Brinks Hofer Gilson & Lione

[57] ABSTRACT

A flush fit removable backlight assembly for a convertible top. The assembly includes an outer frame member having a substantially flat lower body portion and a generally T-shaped upper body portion. The assembly also includes an inner clamping member having a substantially flat lower clamping portion and a generally C-shaped upper clamping portion. To assemble the removable backlight assembly, the opening of the convertible top is attached to the outer frame member. The backlight is then positioned against the lower body portion of the outer frame member. Then, the upper clamping portion of the inner clamping member interlocks or interengages with the upper body portion of the outer frame member so that the lower clamping portion of the inner clamping member engages the opposite side of the backlight.

16 Claims, 3 Drawing Sheets

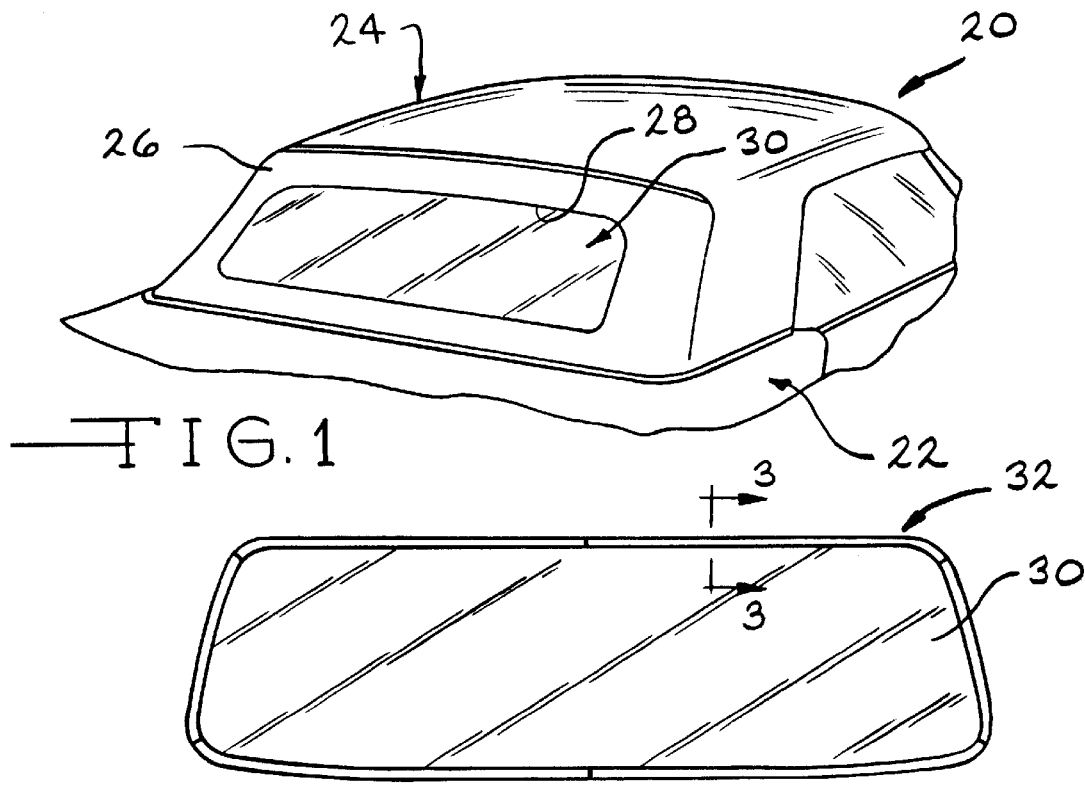
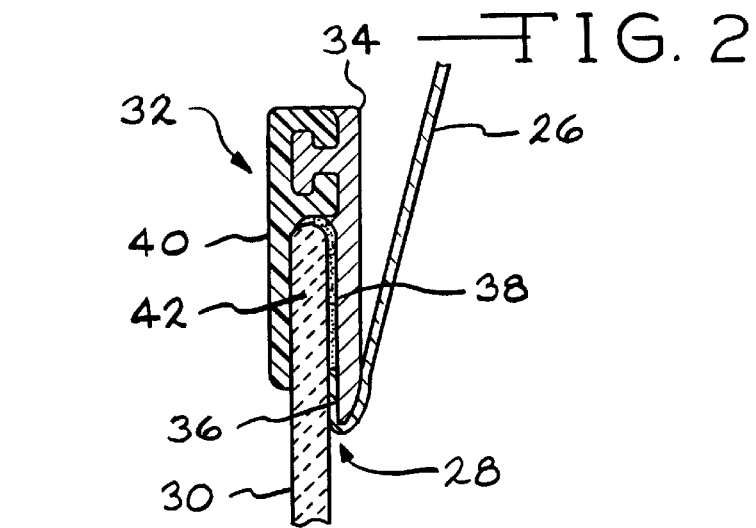

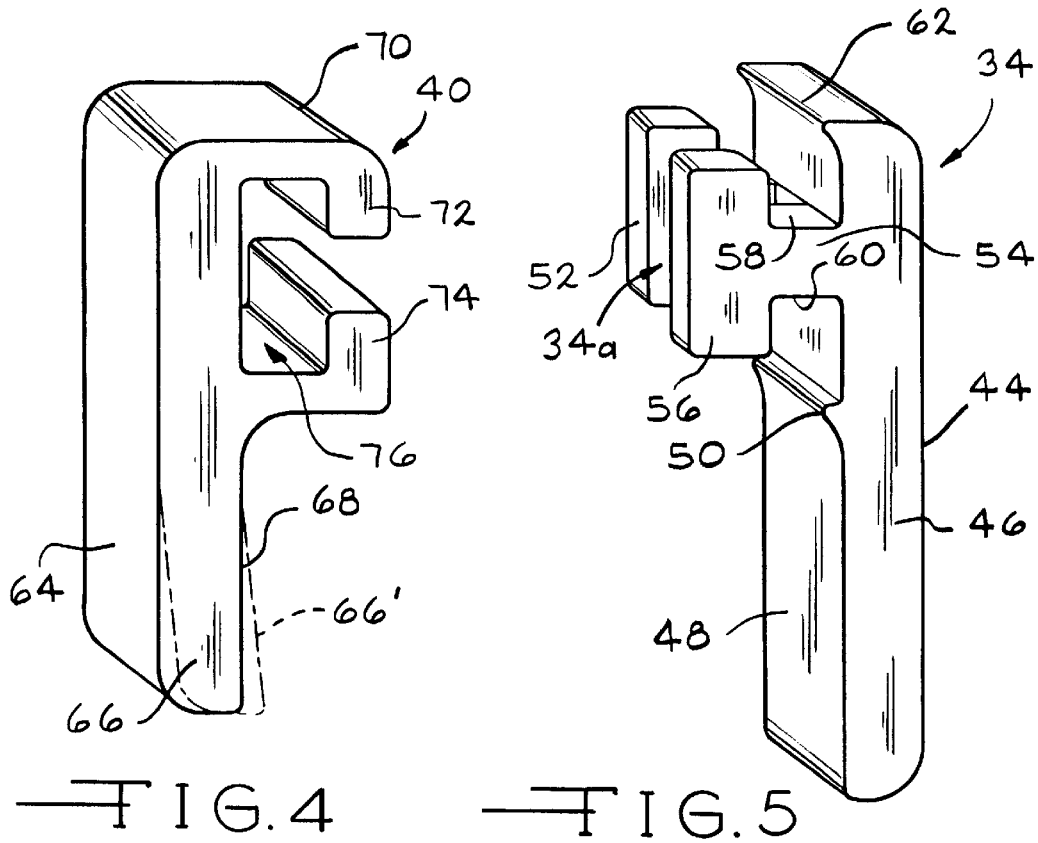
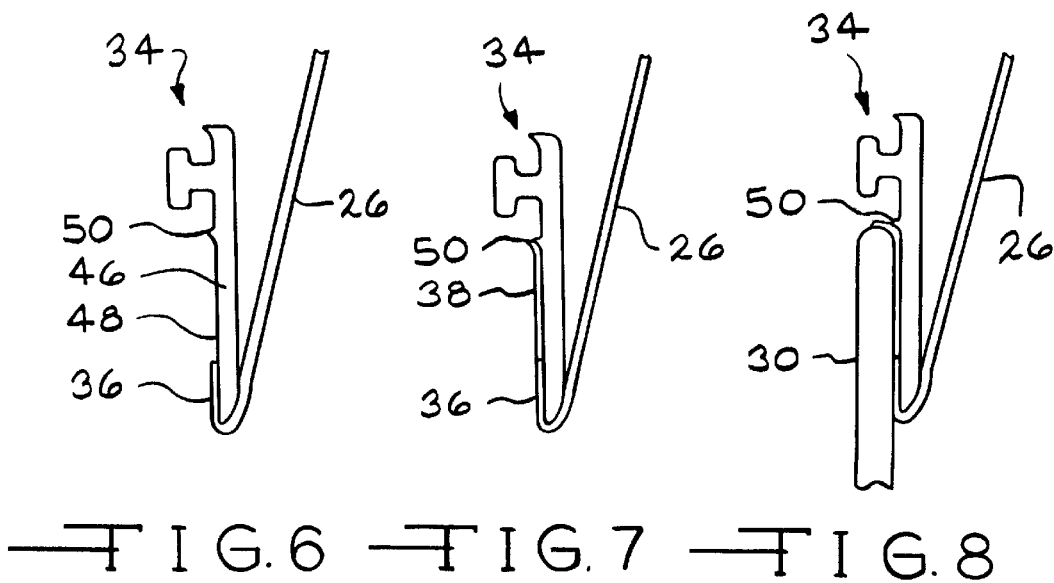

FLUSH FIT REMOVABLE BACKLIGHT

BACKGROUND OF THE INVENTION

1. Field of the Invention

The invention relates in general to automobile convertible tops and, in particular, to a convertible top having a flush fit removable backlight.

2. Related Art

Convertible automobiles are becoming increasingly popular. Although offering the convenience of a top which can be raised or lowered at will, convertibles experience maintenance problems that are unique.

Convertible tops are usually made of a fabric cover stretched over a collapsible articulated frame. Since the tops are of necessity made of canvas or some other soft material to enable folding for compact storage, repeated folding and exposure to harsh weather cause the tops to wear severely. As a result the tops must be periodically removed and replaced.

A convertible top is formed with a rectangular rear opening and mounts a plastic or glass backlight, or rear window, to cover this opening. A plastic backlight has the advantage of being flexible, thus facilitating top storage. The main disadvantage of a plastic backlight is its susceptibility to scratching and discoloration.

In contrast, a glass backlight is scratch resistant, is more durable and will not discolor. However, it can break and is inflexible. Current convertible tops have their backlights permanently bonded to the top cover. Most backlights are currently permanently bonded into the top, as illustrated in U.S. Pat. No. 3,388,945. When the glass backlight is damaged, replacement involves replacing the entire top. If the top cover wears out, the backlight must be replaced along with the entire top.

To avoid replacing the entire top or resewing in the backlight panel, replacement kits have been developed which require the backlight to be cut out of the top and replaced with a unit that includes a new backlight bonded into a canvas covering which must then be sewn or glued onto the old top. Replacement of a backlight by removing the entire backlight panel and sewing in a new panel is shown in U.S. Pat. No. 2,981,564. This is a time-consuming task requiring removal of the top or an awkward procedure of sewing in the panel while the top remains on the vehicle. Gluing in a replacement panel is shown in U.S. Pat. No. 5,016,332. This is an unsatisfactory arrangement since the replacement installation looks like a "patch job" and the canvas covering will not match the original top material in color or texture. enable separate replacement of the top fabric and the backlight, removable backlights of many types have been designed and patented:

U.S. Pat. No. 3,191,989 has a flexible replacement panel with a backlight bonded to a frame. The panel is mounted by upper clamps and lower clips over the belt molding to flex outward to conform to top curvature and engage a weather seal with the top opening periphery.

U.S. Pat. No. 4,611,849 discloses interchangeable (and thus replaceable) glass and plastic backlight panels; the plastic panel is zippered in, while the glass is held mechanically and latched.

U.S. Pat. No. 5,061,332 replaces a backlight by cutting most of the old panel out and bonding a replacement panel to the remaining border via hot melt glue. Multiple replacements are possible by providing the replacement pane with electric heating wires to melt the glue.

U.S. Pat. Nos. 5,040,844 and 5,271,655 et al. both use peripheral zippers to enable backlight replacement. In '844, hot melt adhesive is used as a weather seal, while in '655, interlocking sealing strips are used.

U.S. Pat. Nos. 1,553,099 and 1,723,466 both show mounting a glass pane in a hard frame comprising two parts that are attached by screws to clamp a glass pane between them; as such, the panes are inherently replaceable.

EP 561323 A1 and DE 3835-292-A both disclose using a plurality of spaced plastic snaps to mount a plastic backlight in a top. This allegedly permits quick and easy replacement.

EP 284-931-A uses peripheral mating and interlocking plastic strips to removably mount a backlight.

EP 294-598-A discloses replacing a plastic backlight by unsewing and resewing the panel.

U.S. Pat. Nos. 5,460,424 and 5,464,265 both provide removable backlights which involve bonding a fastener or mounting channel, or bonding mating fastener strips to both the backlight and the top fabric.

All of these prior art arrangements suffer from one or more of several deficiencies, which have prevented their adoption in the industry:

1. They enable backlight removal from the vehicle exterior, enabling unauthorized vehicle entry.
2. They are unduly complex, and difficult to install and remove.
3. They do not provide a good weather seal and are leak-prone.
4. They are unduly complex and costly.
5. They are aesthetically undesirable since they provide a bulky appearance around the backlight.

There is a need for a simple effective removable backlight mounting for a convertible top which provides a good weather seal, is inexpensive, is easy to remove and install, and is aesthetically desirable by providing a smooth appearance around the backlight.

SUMMARY OF THE INVENTION

It is therefore an object of the invention to provide a removable backlight mounting for a convertible top which provides a good weather seal, is inexpensive, is easy to remove and install, and is aesthetically desirable by providing a smooth appearance around the backlight.

In one aspect, the invention features a convertible top comprising a cover having a rear opening for receiving a backlight and having a peripheral skirt, a backlight, and a mounting assembly for removably mounting the backlight within the opening. The mounting assembly includes an outer frame member for framing the outside of the backlight periphery. It is an aluminum extrusion bent and welded into a unitary piece having an outside formed of a substantially flat outer surface. The frame inside comprises a substantially flat lower clamping portion, for embracing the outer periphery of the backlight, and an upper locking portion. An elongated inner clamping member is formed of a TPO extrusion that has an outside formed of a substantially flat outer surface. The clamping member inside comprises a substantially flat lower clamping portion, for embracing the inner periphery of the backlight, and an upper locking portion, which includes an elongated locking portion which is interengageable with the frame member locking portion to clamp the backlight periphery between the clamping portions. The peripheral top fabric skirt extends over the frame member outside surface and is secured to the inner surface of the frame lower clamping portion where it is subsequently clamped by the backlight when the clamping member is locked to the frame member. This arrangement mounts the backlight to the top cover within the opening. The backlight is removable by disengaging the locking portions to unclamp the backlight.

In another aspect of the invention, the top cover skirt is glued to the frame member clamping portion and a foam sealing strip is glued to the inner surface of the clamping portion just above the skirt where it is clamped between the backlight and the frame to provide a weather-tight seal. When the backlight is removed, the frame remains attached to the top cover, thus simplifying installation of a new backlight.

In yet another aspect, the invention features a frame member locking portion that has a T-shaped cross-section, while the clamping member locking portion has a C-shaped cross-section with a mating T-shaped slot. Since the backlight is clamped against inner surface of the aluminum frame by the clamping member, it cannot be removed from outside the top, but only by removal of the clamping member from inside the vehicle. This provides security against forced entry into the vehicle.

In still another aspect, the invention features a clamping member formed of discrete segments and a frame having spaced entry notches formed in the frame locking portion which enable the end of each segment to be inserted and slid into position to form the clamping member and clamp the backlight to the frame completely about its periphery.

In a further aspect, the invention features four frame notches for admitting six clamping member segments, enabling backlight removal by sequentially sliding the clamping member segments out of engagement with the frame through the notches. This simplifies backlight removal since the backlight is retained by the unremoved segments until all are removed, only then requiring manual handling of the backlight.

In a yet further aspect, the invention features a method of removably mounting a backlight within a rear opening of a convertible top cover formed by a peripheral skirt, comprising the steps of a. providing a peripheral frame member for embracing the outer periphery of the backlight and having a locking portion and a lower clamping portion, b. positioning the frame within the opening inside the top cover, folding the skirt around the frame member, and securing it to the inner lower surface of the frame member, c. providing a clamping member having a locking portion and a lower clamping portion, d. interlocking the locking portions to clamp the outer periphery of the backlight between the lower clamping portions of the frame and clamping members, and clamp the top cover skirt between the backlight and the frame member.

Preferably, a notch is provided in the frame member for receiving the end of the clamping member locking portion which is then slid into the frame to interengage locking portions to provide a continuous lock and to clamp the backlight securely to the frame about its periphery.

These and further objects and features of the invention will become more readily apparent upon reference to the following detailed description of a preferred embodiment, as illustrated in the accompanying drawings, in which:

BRIEF DESCRIPTION OF THE DRAWINGS

FIG. 1 is a partial perspective view of a vehicle having a convertible top that incorporates a removable backlight according to the invention;

FIG. 2 is a plan view of the removable backlight shown in FIG. 1;

FIG. 3 is an enlarged sectional view taken along line 3—3 of FIG. 2, illustrating the clamping and frame members of the backlight mounting assembly of the invention;

FIG. 4 is an enlarged perspective view of a portion of the clamping member of FIG. 3;

FIG. 5 is an enlarged perspective view of a portion of the frame member of FIG. 3;

FIGS. 6–8 are sectional views sequentially illustrating the assembly of the backlight to the convertible top;

DETAILED DESCRIPTION OF THE PREFERRED EMBODIMENTS

Figure 9:
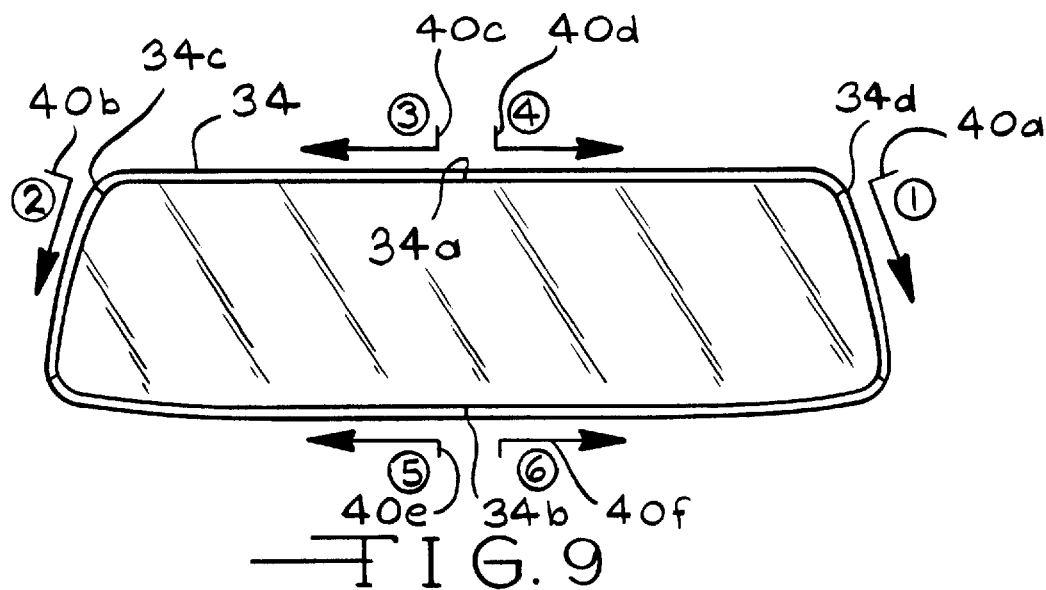
FIG. 9 is a view similar to FIG. 2, showing the sequence of insertion of the clamping member segments to the frame to assemble the backlight to the convertible top.

Referring now to FIG. 1 of the drawings, a convertible vehicle 20 comprises a body 22 having a passenger compartment that is closed by a convertible top 24. The passenger compartment may selectively be opened by lowering top 24 into a storage compartment (not shown) in body 22 in a well-known manner. Top 24 comprises a conventional articulated linkage (not shown) that supports a fabric cover 26 that has a rear opening 28 that is closed by a rear window, or backlight 30.

As shown in FIGS. 2 and 3, backlight 30 is secured to top 24 within opening 28 by a mounting assembly 32 according to the invention. Mounting assembly 32 comprises a peripheral frame member 34 that is secured to a peripheral hem 36 of fabric cover 26 and mounts a peripheral seal member 38. A peripheral clamping member 40 interengages with frame member 34 to clamp the periphery 42 of backlight 30 to frame member 34 to mount backlight 30 to top 24 within opening 28, as will be later described.

Referring additionally to FIG. 5, frame member 34 is an aluminum extrusion that has a substantially flat outer surface 44. The lower body portion 46 is a clamping portion that has a substantially flat inner surface 48 which terminates in an intermediate curved lip 50. An upper body portion 52 mounts a protruding T-shaped elongate member or locking portion having an intermediate member or a stem 54 and a head, or cross-bar 56 which define upper and lower channels 58 and 60. Upper body portion 52 terminates in a curved lip 62. Frame member 34 is preferably a single extrusion that is bent and welded into the shape illustrated in FIG. 2. Several notches (only one, 34a is shown here) are cut into the upper locking portions 54, 56 wide enough to admit the clamping member 40, as later detailed.

FIG. 4 shows the clamping member 40 which is made of an extrusion of TPO or PVC that is fairly stiff (e.g., 68 durometer). Clamping member 40 may comprise a single length of material, or is preferably sliced into several discrete segments to facilitate assembly to frame member 34, as will be later described. Clamping member 40 has a substantially flat outer surface 64 and a lower clamping portion 66 that has a substantially flat inner surface 68. The upper locking portion 70 of clamping member 40 has a C-shaped cross-section having elongate, opposed upper and lower hook segments or members 72 and 74 which define a T-shaped channel 76. Clamping member 40 is extruded with an inward preset to lower clamping portion 66, shown in phantom lines and designated 66' in FIG. 4. It should be noted that the invention is not limited by the cross-sectional shape of the upper body portion 52 and the upper locking portion 70 and that any complementary shape may be used in the invention.

Backlight mounting assembly 32 is formed sequentially as illustrated in FIGS. 6, 7, 8 and 9. Initially, top fabric hem 36 is wrapped around frame lower body portion 46 and bonded by any suitable adhesive to inner surface 48, as in FIG. 6. Next, foam strip 38, which may be of many commercially available foam seals, is bonded to inner surface 48. Foam strip 38 is wide enough to extend from the inner edge of hem 36 to beyond intermediate lip 50, as shown in FIG. 7. Backlight 30 is then placed in frame 34, as shown in FIG. 8.

As shown in FIG. 9, frame 34 includes four spaced notches 34a, 34b, 34c and 34d, which are wide enough to admit the end of clamping member 40, which is sliced into six segments, designated schematically as 40a, 40b, 40c, 40d, 40e and 40f. These segments are then inserted into frame 34 through the indicated notches in the sequence indicated by circled numbers.

While backlight 30 is manually held in place, segment 40a is inserted through notch 34d, and locking head 70 embraces the T-shaped frame upper body portion 52, with hook segments 72 and 74 entering channels 58 and 60, as shown in FIG. 8. This action distorts clamping member lower clamping portion 66 to its solid line position in FIG. 4 to provide added clamping force on backlight 30. This segment is slid lengthwise until it is fully inserted in frame 34. Segment 40b is then similarly inserted through notch 34c and slid along frame member 34. Backlight 30 can now be released, since clamping member segments 40a and 40b will hold it in place while clamping member segments 40c and 40d are inserted through notch 34a, and, lastly, segments 40e and 40f are inserted through notch 34b.

The clamping member segments are sized to provide a continuous peripheral clamping of backlight 30 to frame when inserted. This clamping action compresses fabric hem 36 and foam seal strip 38 to provide a weather-tight seal for backlight 30.

Figure 10:
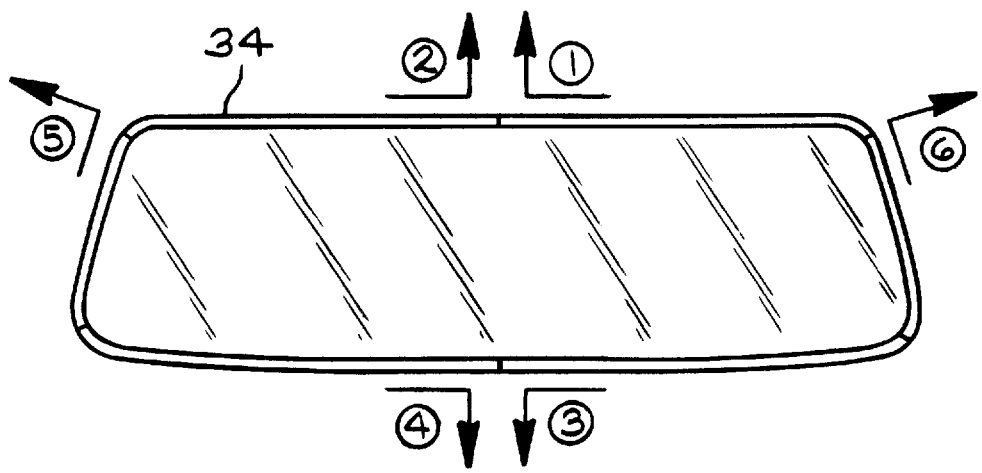
FIG. 10 is a view similar to FIG. 9 but showing the sequence of removal of the clamping member segments from the frame to enable removal of the backlight from the top.

Should it become necessary to remove and replace backlight 30, it is only necessary to remove clamping member strips 40a, 40b, 40c, 40d, 40e and 40f in the numbered sequence shown in FIG. 10. A flat head screwdriver is initially inserted into notch 34a to pry out the end of clamping member segment 40d which is grasped by needle-nose pliers and pulled out of frame 34. This procedure is repeated for segments 40c, 40f and 40e. At this point, backlight 30 is retained in frame 34 only by the side segments 40a and 40b. As segment 40b is removed, backlight 30 must be manually supported until segment 40a is removed, whereupon backlight 30 will fall out of frame 34. A new backlight 30 is then assembled as indicated above.

As an alternative to manually supporting backlight 30 a light adhesive or adhesive tape could be applied at spaced intervals on the exterior periphery of backlight 30 to temporarily attach it to frame 34 until the clamping member segments are inserted.

As described above, the mounting assembly according to the invention enables the backlight to be quickly and easily assembled to the top fabric and just as easily removed and replaced. No special tools or fasteners are required. The backlight mounting assembly of the invention provides a flush fit look exteriorly of the convertible top. Neither the frame or the clamping member is observable from outside the vehicle. Also, there is no read through since frame member has a flat smooth outer surface. Interiorly, because of sizing and plasticity, the clamping member segments present the appearance of a continuous member when installed. Since the clamping member is applied from inside the vehicle and the frame is bonded to the top cover skirt, unauthorized entry to the vehicle through the backlight is prevented.

While only a preferred embodiment has been illustrated and described, obvious modifications thereof are contemplated within the scope of the invention.

What is claimed is:

1. A flush fit, removable backlight assembly, comprising:
   a backlight;
   a frame member having a lower body portion and an upper body portion, said upper body portion including an elongate member disposed generally parallel to said upper body portion, spaced therefrom by an intermediate member and having a cross bar forming a generally T-shaped portion and defining upper and lower channels; and
   an elongate clamping member having a lower clamping portion and an upper locking portion, said upper locking portion including elongate, opposed members defining a region adapted to receive said elongate member of said upper body portion of said frame member,
   wherein said elongate member of said upper body portion of said frame member interlocks with said elongate opposed members of said upper locking portion of said clamping member, said lower body portion of said frame member engages one side of the backlight and said lower clamping portion of said clamping member engages an opposite side of said backlight.

2. The assembly according to claim 1, wherein said clamping member comprises a plurality of discrete segments for facilitating installation of said clamping member.

3. The assembly according to claim 2, further comprising a plurality of notches in said elongate member of said upper body portion of said frame member.

4. The assembly according to claim 1, wherein said elongate, opposed members of said upper locking portion of said clamping member include upper and lower hook segments forming a generally T-shaped channel adapted to receive said generally T-shaped portion of said upper body portion of said frame member.

5. The assembly according to claim 1, wherein said lower body portion of said frame member and said lower clamping portion of said clamping member include substantially flat inner and outer surfaces.

6. The assembly according to claim 5, wherein the inner surfaces of said frame member and said clamping member engage opposite sides of the backlight to clamp a cover of a convertible top securely in place.

7. A flush fit, removable backlight assembly for removably mounting a backlight within an opening of a convertible top cover, said assembly comprising:
   an outer frame member for framing an outer surface of the backlight, said outer frame member including an elongate member disposed generally parallel to said outer frame member and spaced therefrom by an intermediate member; and
   an inner clamping member for embracing an inner surface of the backlight, said inner clamping member including elongate, opposed members defining a region adapted to receive said elongate and intermediate members of said frame member, wherein said outer frame member interlocks with the said inner clamping member to clamp the backlight.

8. The assembly according to claim 7, wherein said outer frame member includes a lower body portion and an upper body portion and said intermediate member extends from said upper body portion.

9. The assembly according to claim 8, wherein said inner clamping member includes a lower clamping portion and an upper locking portion and said opposed members extend from said upper locking portion.

10. The assembly according to claim 9, wherein said elongate member of said upper body portion of said outer frame member interlocks with said opposed members of said upper locking portion of said inner clamping member.

11. The assembly according to claim 7, wherein said inner clamping member is formed of discrete segments, and said outer frame member includes entry notches capable of receiving an end of each discrete segment to be inserted and slid into position.

12. The assembly according to claim 7, wherein the top cover extends over an outside surface of said outer frame member and is secured to an inner surface of said outer frame member, the top cover being clamped to the backlight by said outer frame member when said inner clamping member interlocks with said outer frame member.

13. A method of removably mounting a backlight within an opening of a convertible top cover, comprising the steps of:

providing a frame member having an upper locking portion defining at least one notch and a lower clamping portion;

folding a portion of the top cover around the frame member;

securing the portion of the top cover to the lower clamping portion of the frame member;

placing the backlight against the lower clamping portion of the frame member;

providing a clamping member having an upper locking portion and a lower clamping portion; and interlocking the upper locking portion of the clamping member and the upper locking portion of the frame member by starting at the at least one notch and sliding one of said frame and said clamping members along another of said member 5 in a direction substantially parallel to an edge of said opening whereby the backlight is clamped between the lower clamping portion of the frame member and the lower clamping portion of the clamping member, and whereby the top cover is clamped between the backlight and the frame member.

14. The method of claim 13, wherein said interlocking step comprises inserting segments of the clamping member through notches in the frame member.

15. The method of claim 13, further comprising the step of securing a foam strip to the lower clamping portion of the frame member prior to placing the backlight against the frame member.

16. The method of claim 13 wherein said interlocking step includes sliding said clamping member along said frame member.

\* \* \* \* \*